June 16, 1936. C. CAISE 2,044,524
DISHWASHING MACHINE
Filed July 8, 1935 2 Sheets-Sheet 2

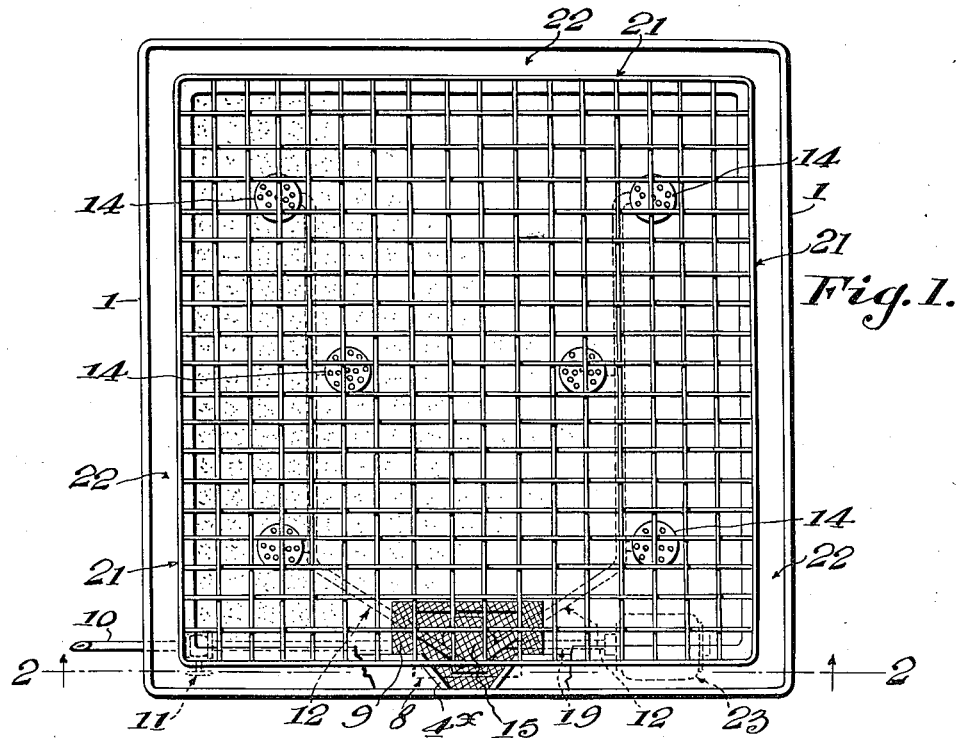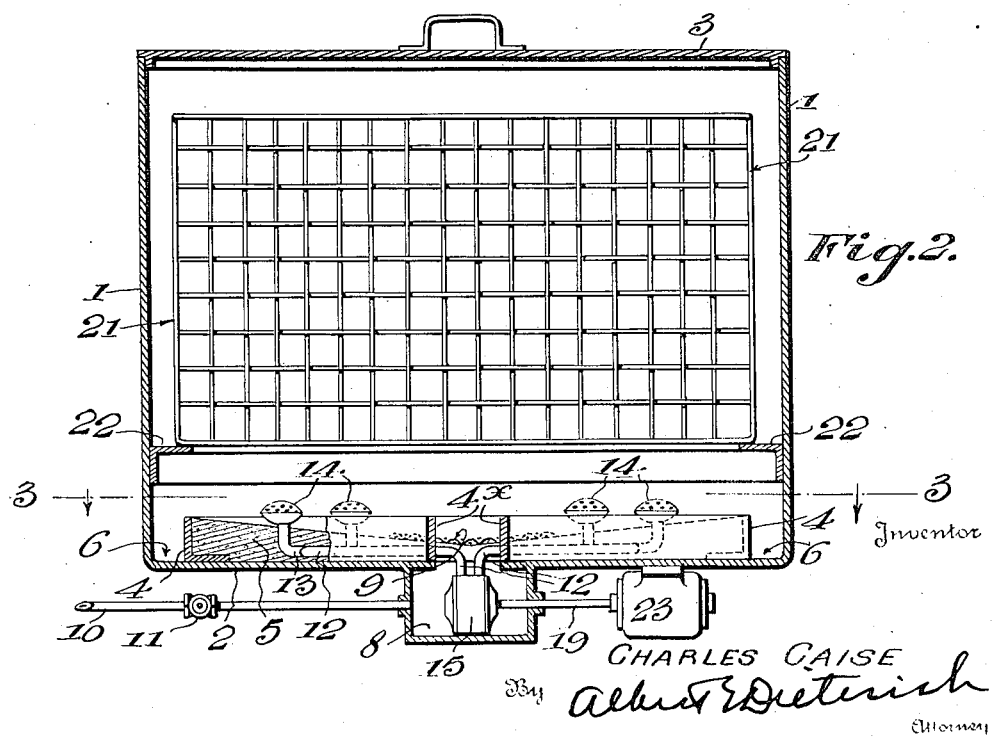

Inventor
CHARLES CAISE
By Albert E. Dieterich
Attorney

Patented June 16, 1936

2,044,524

UNITED STATES PATENT OFFICE 2,044,524

DISHWASHING MACHINE

Charles Caise, Brooklyn, N. Y.

Application July 3, 1935, Serial No. 30,397

8 Claims. (Cl. 141—9)

The conventional types of dish-washing machines are more or less complicated and contain parts that will get out of order easily and run up repair bills.

The present invention has for an object to provide a dish-washing machine which is very simple in structure, has few moving parts, is inexpensive to operate and is most effective in operation.

Further, it is an object to provide a machine in which the dishes will be thoroughly cleansed and none of them will be broken or cracked.

Again, it is an object to provide a machine in which the temperature of the water is constant, thus assuring efficient operation.

Further, it is an object to provide a dish-washing machine which is strong, durable and practical, and one having few movable parts to get out of order.

Generically, the invention comprises a container, within which a basket for dishes is positioned. A sump is located under the container and communicates with the hot water inlet and with a retaining basin that is located above the sump box. A pump, driven by a small electric motor, is within the sump box and forces the water through communicating pipes and spray nozzles that shoot the hot water up against the dishes (the spray falling to the bottom of the machine has a further cleansing action on the dishes). A depression in the bottom of the machine carries the used water to a drain pipe at the rear.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:—

Figure 1 is a plan view of the machine, the cover being omitted and part of the frame 22 being broken away.

Figure 2 is a vertical section on the line 2—2 of Figure 1.

Figure 3:
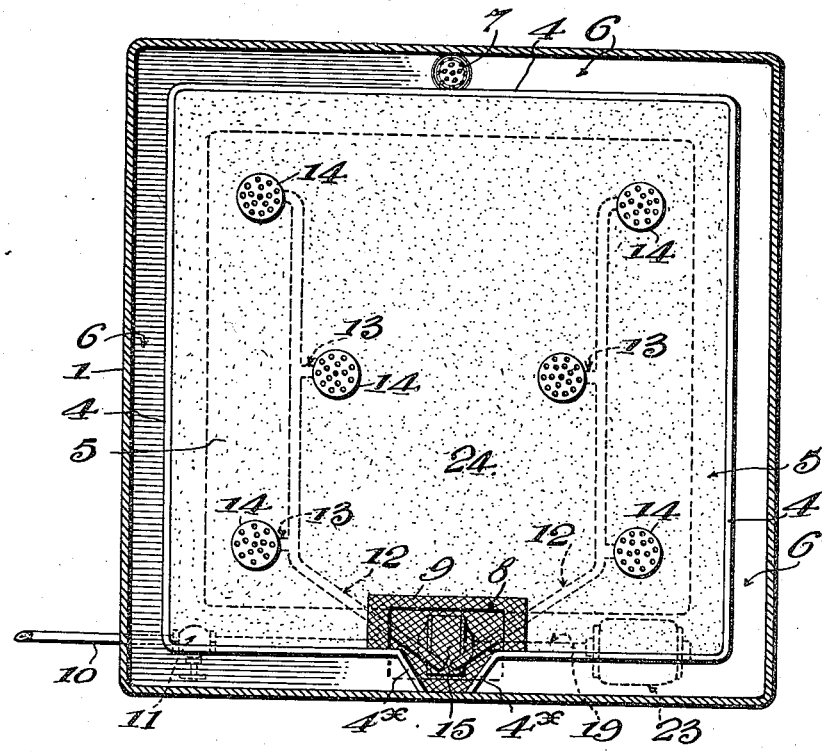
Figure 3 is a horizontal section on the line 3—3 of Figure 2.

In the drawings, in which like numerals of reference indicate like parts in all the figures, 1 represents the housing or casing of the machine, there being a removable cover or top 3 provided as shown. On the bottom 2 is suitably held an angle iron frame 4 which is spaced from the sides of the casing 1 and has inclined wall portions 4x extending to the fourth side. The frame, being spaced from the sides, constitutes, with the side walls of the casing, a channel or trough 6. Within the compass of the frame 4 is located a mass 5 shaped with an inclined top surface to effect an easy draining of the water toward the sump 8. The mass 5 may be of any suitable material, for example, vitrified clay or porcelain.

A suitable depression 7 to drain the trough 6 is provided, preferably midway the ends of the trough (see Figure 3). To prevent solid pieces from entering the sump 8 and interfering with the action of the pump, the top of the sump is covered with plain wire mesh 9 or other suitable perforated material. The sump 8 is located centrally at the low side of the basin 24 formed by the mass 5 and the angle iron 4.

A pipe 10, having a control and shut-off valve 11, constantly delivers hot water from a suitable source to the sump 8.

Within the sump 8 is a duplex pump 15 having a partition 20 dividing it into two impeller chambers, in each of which is located an impeller 18 and shaft 19 that is driven by a motor 23. The side walls of the pump have inlets 16 through which water is drawn by the impellers 18, which force it through outlets 17 into delivery pipes 12 having branches 13 to spray nozzles 14. The nozzles 14 are of such number and are so located as to send upwardly over the entire cross sectional area of the casing 1 fine sprays, forming a mist.

Located immovably above the spray nozzles 14 is a basket 21 (preferably of wire) which is of a size to conform with the casing 1, but smaller so as to be spaced from the sides, bottom and top thereof, into which basket the dishes to be washed are placed and through which the sprays are directed. The basket 21 is held in position within the casing 1 in any suitable way, as by means of an angle iron frame 22 secured to the side walls of the casing 1.

Operation

Figure 4:
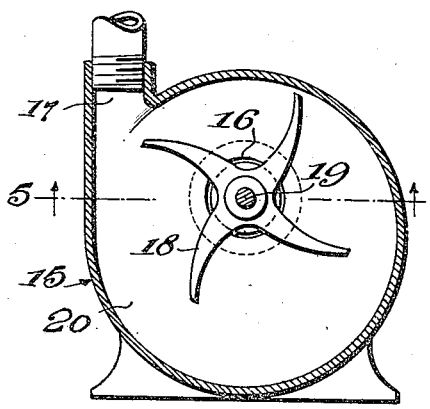
Figure 4 is an enlarged vertical section of the pump.
Figure 5:
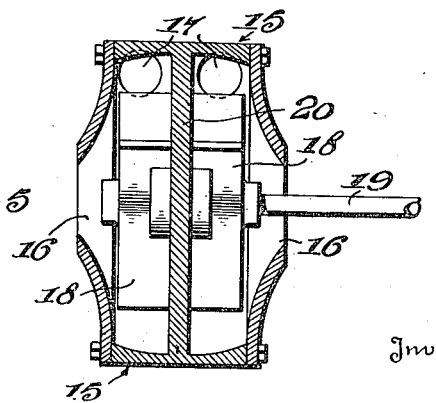
Figure 5 is a section on the line 5—5 of Figure 4.

Dishes being in the basket 21 and the basket being in place in the casing 1, the valve 11 is opened and motor 27 is turned on. Since the basket 21 does not move while in the casing 1, this assures that the dishes will not be broken during the washing operation. The dishes in the basket are thoroughly washed by the fine jets of water upwardly directed from the nozzles 4 and the downward dropping of the water. There are, preferably, six of these nozzles, as indicated in Figure 3, and the water is projected in all directions upwardly therefrom. The water is hot and is led through the hot water pipe 10 into the box of the sump 8, which holds a supply of water, to be delivered into the casing at, say, from six to eight gallons per minute by means of the duplex pump (shown in detail in Figures 4 and 5) located in the sump box. The pump drives the water from the sump box through the pipes 12—13 and nozzles 14. A part of the water which drops into the basin 24 is returned to the sump 8, while the remainder (the dirty greasy water which floats) overflows the sides of the basin into the trough 6 and passes out through the drain 7 while an equal amount of fresh water flows into the sump 8 from the supply pipe 10. Water which runs down the walls of the casing is diverted into the basin 24 by the flange 22. Any solids which may be washed down from the dishes into the basin 24 are prevented from entering the sump by the screen 9. The basin 24 being always full of hot water, once the machine is started, a plentiful supply of hot water is always at hand for keeping the pump primed.

From the foregoing it will be seen that I have devised a dish-washing machine that is strong, durable and practical. It has no movable parts to get out of order. The basket is firm and is located stationary. Jets of water driven upwardly through the nozzles strike all parts of the dishes and remove any small particles that may be left as the water descends to flow through the drain. The pump is positive in operation and requires a motor of only a fraction of horsepower to operate it.

The simplicity of construction, reasonable cost of manufacture, absence of upkeep expense and cheap operative cost, together with the convenience, practicability, safety and ease of handling, and perfect satisfaction which feature this machine make it particularly attractive to manufacturers and dish washers.

From the foregoing description, taken in connection with the accompanying drawings, it is thought that the complete construction, operation and advantages of the invention will be clear to those skilled in the art to which it relates.

What I claim is:

1. In a dish-washing machine, a casing having a bottom, a basin on the bottom spaced from the sides of the casing to constitute therewith a drainage channel or trough surrounding the basin, an outlet for said trough, a sump into which a portion of the fluid contents of said basin are delivered, a hot water supply pipe connected to said sump, a pump in said sump, spray nozzles within said casing for spraying water upwardly, delivery pipes from said pump to said nozzles, and a basket for dishes located in said casing above said nozzles and said basin.

2. In a dish-washing machine, a casing having a bottom, a frame located on said bottom and spaced from walls thereof to provide in co-operation with said walls, a drainage channel or trough, a drain outlet for said trough, a sump beneath said bottom, a pump in said sump, means to deliver some of the water from within the confines of said frame inside said casing back to said sump, means to deliver water from an outside source to said sump, nozzles within said casing, means to convey water from said pump to said nozzles, and means within said casing to hold dishes above said nozzles, said frame being constituted to embrace and confine an area for the reception of dirty water and permit overflow of the greasy water into said drainage channel and thus cause a separation of the greasy water from the circulated liquid.

3. In a dish-washing machine, a casing having a bottom, sides and a removable cover, a trough at the bottom of the casing along sides thereof, a basin encompassed by said trough, the overflow from which basin enters said trough, a drain outlet from said trough, a pump, means to deliver water to said pump in part from said basin and in part from an external source of supply, upwardly directed nozzles in said casing, means for delivering the water from said pump to said nozzles, and a dish-holding means within said casing above said nozzles and said basin.

4. In a dish-washing machine, a casing having a bottom, sides and a removable cover, a trough at the bottom of the casing along sides thereof, a drain outlet from said trough, a pump, means to deliver water to said pump, upwardly directed nozzles in said casing, means for delivering the water from said pump to said nozzles, said machine also having a basin within the compass of said trough, for holding water, a sump for receiving water from said basin, said pump being in communication with said sump and a dish-holding means within said casing above said nozzles and said basin.

5. A casing of rectangular cross section, having a bottom with a channel adjacent side walls of the casing, and a basin within the compass of the channel, a drainage outlet for said channel, a sump beneath said bottom and in connection with said basin, external means to deliver hot water to said sump, two sets of nozzles in said casing for directing water sprays upwardly and laterally, a duplex pump in said sump, means leading water from each chamber of said pump to a set of said nozzles, and a dish-holding basket located in said casing above said nozzles and said basin, and spaced from the walls of said casing.

6. A casing of rectangular cross section, having a bottom with a channel adjacent side walls of the casing, and a basin within the compass of the channel, a drainage outlet for said channel, a sump beneath said bottom and in connection with said basin, external means to deliver hot water to said sump, nozzles in said casing for directing water sprays upwardly and laterally, a pump in said sump, means leading water from said pump to said nozzles, and a dish-holding basket located in said casing above said nozzles and said basin.

7. In a dish washing machine, a casing having a horizontally disposed bottom, a basin on said bottom with its margin spaced from the sides of the casing to constitute with said sides an overflow channel for the dirty greasy water from said basin, a fluid drainage outlet from said channel, a sump in communication with said basin into which fluid from said basin is returned, means to strain the liquid returned to said sump, a pump and a source of fresh water supply communicating with said sump, nozzles located to deliver water upwardly above said basin, means to deliver water from said pump to said nozzles, and a basket for dishes located in said casing above said basin in virtue of all of which the falling water will drop into said basin while the dirty greasy water will overflow the sides of said basin and be drained from the casing while fresh water enters the sump from the source of supply and a portion of the wash water from the basin is returned to the sump for recirculation.

8. In a dish washing machine, a casing having a horizontally disposed bottom, a basin on said bottom with its margin spaced from the sides of the casing to constitute with said sides an overflow channel for the dirty greasy water from said basin, a fluid drainage outlet from said channel, a sump in communication with said basin into which fluid from said basin is returned, means to strain the liquid returned to said sump, a pump and a source of fresh water supply communicating with said sump, nozzles located to deliver water upwardly above said basin, means to deliver water from said pump to said nozzles and a basket for dishes located in said casing above said basin, a flange projecting inwardly from the side walls of said casing overlying said drainage channel and spaced above the same for supporting said basket and for diverting water which may run down the walls of the casing into said basin, in virtue of all of which the falling water will drop into said basin while the dirty greasy water will overflow the sides of said basin and be drained from the casing while fresh water enters the sump from the source of supply, and a portion of the wash water from the basin is returned to the sump for recirculation.

CHARLES CAISE.